(12) United States Patent
Assadzadeh

(10) Patent No.: US 8,255,534 B2
(45) Date of Patent: *Aug. 28, 2012

(54) POLICY ANALYZER

(75) Inventor: Alireza Assadzadeh, Ontario (CA)

(73) Assignee: Juniper Networks, Inc., Sunnyvale, CA (US)

(*) Notice: Subject to any disclaimer, the term of this patent is extended or adjusted under 35 U.S.C. 154(b) by 103 days.

This patent is subject to a terminal disclaimer.

(21) Appl. No.: 12/818,263

(22) Filed: Jun. 18, 2010

(65) Prior Publication Data

US 2010/0257264 A1 Oct. 7, 2010

Related U.S. Application Data

(63) Continuation of application No. 12/164,353, filed on Jun. 30, 2008, now Pat. No. 7,769,860, which is a continuation of application No. 10/716,484, filed on Nov. 20, 2003, now Pat. No. 7,409,447.

(51) Int. Cl.
*G06F 15/173* (2006.01)

(52) U.S. Cl. ........ 709/225; 709/224; 709/229; 709/232; 726/1; 370/230.1; 370/235

(58) Field of Classification Search .......... 709/223–225, 709/226, 229; 370/230.1, 325, 230, 235; 726/1

See application file for complete search history.

(56) References Cited

U.S. PATENT DOCUMENTS

| | | | |
|---|---|---|---|
| 6,119,185 A | 9/2000 | Westerinen et al. | |
| 6,466,984 B1 | 10/2002 | Naveh et al. | |
| 6,678,248 B1 | 1/2004 | Haddock et al. | |
| 6,718,380 B1 | 4/2004 | Mohaban et al. | |
| 6,831,895 B1 | 12/2004 | Ji et al. | |
| 6,973,034 B1 | 12/2005 | Natarajan et al. | |
| 7,003,562 B2 | 2/2006 | Mayer | |
| 7,050,396 B1 | 5/2006 | Cohen et al. | |
| 7,076,547 B1 | 7/2006 | Black | |
| 7,272,115 B2 * | 9/2007 | Maher et al. | 370/253 |
| 7,340,531 B2 | 3/2008 | Rasheed et al. | |
| 7,346,677 B1 | 3/2008 | Mohaban et al. | |
| 7,409,447 B1 | 8/2008 | Assadzadeh | |
| 7,769,860 B1 * | 8/2010 | Assadzadeh | 709/225 |
| 2002/0101826 A1 * | 8/2002 | Giacopelli et al. | 370/252 |
| 2002/0133614 A1 | 9/2002 | Weerahandi et al. | |
| 2002/0191549 A1 | 12/2002 | Mckinley et al. | |
| 2003/0140151 A1 | 7/2003 | Daenen et al. | |
| 2003/0152034 A1 | 8/2003 | Zhang et al. | |
| 2003/0212908 A1 | 11/2003 | Piesco | |

(Continued)

OTHER PUBLICATIONS

Co-pending U.S. Appl. No. 12/164,353, filed Jun. 30, 2008 entitled "Policy Analyzer" by Alireza Assadzadeh, 58 pages.

*Primary Examiner* — Oanh Duong
(74) *Attorney, Agent, or Firm* — Harrity & Harrity, LLP

(57) ABSTRACT

Systems and methods are provided for analyzing policy rules defined for a subscriber and determining packet treatment in a network. Definitions are retrieved pertaining to policy rules for a subscriber. At least one policy point in a network is determined based on the retrieved definitions. The packet treatment is determined at each of the at least one policy point. The packet treatment is shown for each of the at least one policy point. Packets may be injected into the network at injection points and statistics may be collected. The statistics may be compared with results of analyzing policy rules for the subscriber.

20 Claims, 19 Drawing Sheets

U.S. PATENT DOCUMENTS

| | | |
|---|---|---|
| 2004/0039942 A1 | 2/2004 | Cooper et al. |
| 2004/0064575 A1 | 4/2004 | Rasheed et al. |
| 2004/0109410 A1 | 6/2004 | Chase et al. |
| 2005/0071445 A1 | 3/2005 | Siorek et al. |
| 2005/0076235 A1 | 4/2005 | Ormazabal et al. |

* cited by examiner

| Policy Rules | Description |
|---|---|
| PR1 | Rate Limit 64kbps ftp traffic. Precedence 30 |
| PR2 | Forward Video teleconference. Precedence 10 |

Fig. 2

| Policy Rules | Description |
| --- | --- |
| PR1 | Rate Limit at 64 kbps FTP traffic. Precedence 30 |
| PR2 | Forward web traffic. Precedence 20 |
| PR3 | Forward ISP content server traffic. Precedence 10 |
| PR4 | Filter any traffic. Precedence 100 |

Fig. 11

| Traffic Group | Description | Policy Rules with matching condition |
| --- | --- | --- |
| TG1 | FTP traffic not 10.10.10.0/24 | [PR1] |
| TG2 | www traffic not 10.10.10.0/24 | [PR2] |
| TG3 | 10.10.10.0/24 traffic (including FTP and www) | [PR3] |
| TG4 | Not FTP or WWW and not 10.10.10.0/24 | [PR4] |

Fig. 12

| Policy Rules | Description |
|---|---|
| PR1 | match 10.10.10.0/24 traffic |
| PR2 | match 20.20.20.0/24 traffic |
| PR3 | match 10.10.0.0/16 traffic |

Fig. 13

| Address Range | Policy Rules with Matching Conditions |
|---|---|
| 0.0.0.0 - 10.9.255.255 | [] |
| 10.10.0.0 - 10.10.9.255 | [PR3] |
| 10.10.10.0 - 10.10.10.255 | [PR1, PR3] |
| 10.10.11.0 - 10.10.255.255 | [PR3] |
| 10.11.0.0 - 20.20.19.255 | [] |
| 20.20.20.0 - 20.20.20.255 | [PR2] |
| 20.20.21.0 - 255.255.255.255 | [] |

Fig. 14

| TG | Address Range | Policy Rules with Matching Conditions |
|---|---|---|
| 1 | 0.0.0.0 - 10.9.255.255 | [] |
| 2 | 10.10.0.0 - 10.10.9.255 | [PR3] |
| 3 | 10.10.10.0 - 10.10.10.255 | [PR1, PR3] |
| 2 | 10.10.11.0 - 10.10.255.255 | [PR3] |
| 1 | 10.11.0.0 - 20.20.19.255 | [] |
| 4 | 20.20.20.0 - 20.20.20.255 | [PR2] |
| 1 | 20.20.21.0 - 255.255.255.255 | [] |

Fig. 15

| TG | Address Range | Policy Rules with Matching Conditions |
|---|---|---|
| 1 | 0.0.0.0 - 10.9.255.255<br>10.11.0.0 - 20.20.19.255<br>20.20.21.0 - 255.255.255.255 | [] |
| 2 | 10.10.0.0 - 10.10.9.255<br>10.10.11.0 - 10.10.255 255 | [PR3] |
| 3 | 10.10.10.0 - 10.10.10.255 | [PR1, PR3] |
| 4 | 20.20.20.0 - 20.20.20.255 | [PR2] |

Fig. 16

| Service Session | PR | PRECEDENCE | SOURCE | DESTINATION | ACTION | Analysis | |
|---|---|---|---|---|---|---|---|
| | | | | | | A1 | A2 |
| PPP | To cp1 | 300 | any | ?cp1 | NextHop | Eclipsed | Ignored |
| PPP | To cp2 | 300 | any | ?cp2 | NextHop | Ignored | Eclipsed |
| PPP | To SAE | 500 | any | ?SAE | Forward | Ignored | Ignored |
| Be512 | Internet | 400 | any | not ?cp1 and not ?cp2 | Forward | Ignored | Ignored |
| CP1 | Cp1 | 200 | any | ?cp1 | RateLimitX | In Effect | Ignored |
| CP2 | Cp2 | 200 | any | ?cp2 | RateLimitY | Ignored | In Effect |

Fig. 18

| Packet/Flow | Important/relevant characteristics of packet |
|---|---|
| A1 | FTP traffic from 1.1.1.1 |
| A2 | www traffic from 1.1.1.1 |
| A3 | telnet traffic from 1.1.1.1<br>source port: telnet (23) |
| A4 | SMTP traffic from 1.1.1.1 |
| A5 | A video packet from the ISP content server at 10.10.10.2 (server subnet is 10.10.10.0./24) |

Fig. 20

| Packet/Flow | Point Analysis at Router X |
|---|---|
| A1 | PR1 and PR4 matched. PR1 is in effect. PR4 is eclipsed due to precedence. |
| A2 | PR2 and PR4. PR2 is in effect. PR4 is eclipsed due to precedence. |
| A3 | PR4 is in effect |
| A4 | PR4 is in effect |
| A5 | PR3 and PR4 matched. PR3 is in effect due to precedence. |

Fig. 21

| Packet/Flow | Traffic Group | Policy Rules In Effect |
|---|---|---|
| A1 | Belongs to TG1 | PR1 |
| A2 | Belongs to TG2 | PR2, PR4 |
| A3 | Belongs to TG4 | PR4 |
| A4 | Belongs to TG4 | PR4 |
| A5 | Belongs to TG3 | PR3 |

Fig. 22

POLICY ANALYZER

RELATED APPLICATIONS

This application is a continuation of U.S. patent application Ser. No. 12/164,353, filed Jun. 30, 2008, which is a continuation of Ser. No. 10/716,484, filed Nov. 20, 2003 (now U.S. Pat. No. 7,409,447), the entire contents of which are incorporated herein by reference.

TECHNICAL FIELD

The invention relates to the field of computer networks, and more particularly to systems and methods for analyzing policies in computer networks.

BACKGROUND OF THE INVENTION

Policies that control resources in a network are distributed and managed by multiple independent active system components. Currently, network design and resource policies are analyzed by setting up a test network and using various devices to inject traffic into the test network at different injection points. Designers then observe and analyze resulting traffic and behavior of the test network. If the test network does not behave as expected, designers may change the network and/or resource policies and reinject test traffic into the network so that they may observe and analyze behavior in the changed network. Due to a lack of analysis tools, such testing is quite cumbersome, time consuming and error prone.

SUMMARY OF THE INVENTION

Systems and methods are provided for analyzing policy rules defined for a subscriber and determining packet treatment in a network.

In a first aspect of the invention, a method is provided for analyzing policy rules for a subscriber and determining packet treatment. Definitions are retrieved pertaining to policy rules for a subscriber. At least one policy point in a network is determined based on the retrieved definitions. The packet treatment is determined at each of the at least one policy point. Information corresponding to the packet treatment is output for each of the at least one policy point.

In a second aspect of the invention, one or more devices are provided for analyzing packet treatment in a network. The one or more devices include a user input/output interface, a database interface, a management server interface, a network interface and analyzer logic. The user input/output interface is configured to receive input from a user interface and to send output to the user interface. The database interface is configured to access definitions in a database. The management server interface is configured to request and receive information from a management server. The network interface is configured to request and receive information from devices in the network. The analyzer logic is configured to analyze packet treatment based on policy rules defined for a subscriber.

In a third aspect of the invention, a system for analyzing packet treatment in a network is provided. The system includes a management server, a database, a policy analyzer and a user input/output interface. The management server is configured to load policy rules and service definitions to a router when a subscriber session is established. The database includes definitions of policy rules, service definitions and a network configuration. The database is configured to be accessible by the management server. The policy analyzer is configured to analyze packet treatment based on ones of the policy rules and the service definitions defined for a subscriber. The policy analyzer is configured to access the management server and the database. The user input/output interface is configured to provide input to the policy analyzer and receive analysis results from the policy analyzer.

In a fourth aspect of the invention, one or more network devices are provided. The one or more network devices include an analyzer interface and a statistics module. The analyzer interface is configured to receive commands from a policy analyzer and send information to the policy analyzer. The statistics module is configured to collect statistics of traffic injected into a network. The statistics module is further configured to send the collected statistics to a policy analyzer via the analyzer interface.

In a fifth aspect of the invention, one or more devices are provided for analyzing packet treatment in a network. The one or more devices include means for receiving input from a user interface and for sending output to the user interface, means for accessing definitions in a database, means for requesting and receiving information from a management server, and means for analyzing packet treatment based on policy rules defined for a subscriber.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 2 illustrates exemplary policy rules that may define a service;

FIG. 11 illustrates exemplary policy rules;

FIG. 12 shows exemplary results of a traffic group analysis using the policy rules of FIG. 11;

FIG. 13 illustrates another set of exemplary policy rules;

FIG. 14 illustrates an entire address range and matching policy rules using the policy rules of FIG. 13;

FIG. 15 shows traffic groups, address ranges and matching policy rules as a result of a traffic group analysis using the policy rules of FIG. 13;

FIG. 16 illustrates the traffic groups of FIG. 15 combined into four groups of address ranges;

FIG. 18 illustrates results of an exemplary "what if" analysis;

FIG. 20 illustrates exemplary packet/flows and corresponding characteristics;

FIG. 21 shows results of analysis using the packet/flows of FIG. 20;

FIG. 22 shows results of traffic group analysis of the packet/flows of FIG. 20.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Embodiments of the invention may be implemented in hardware, software, or firmware. The firmware may in a Read-Only Memory (ROM) and the software may reside on, for example, a medium such as a floppy disk, optical disk, or CD ROM.

Overview

Figure 1:
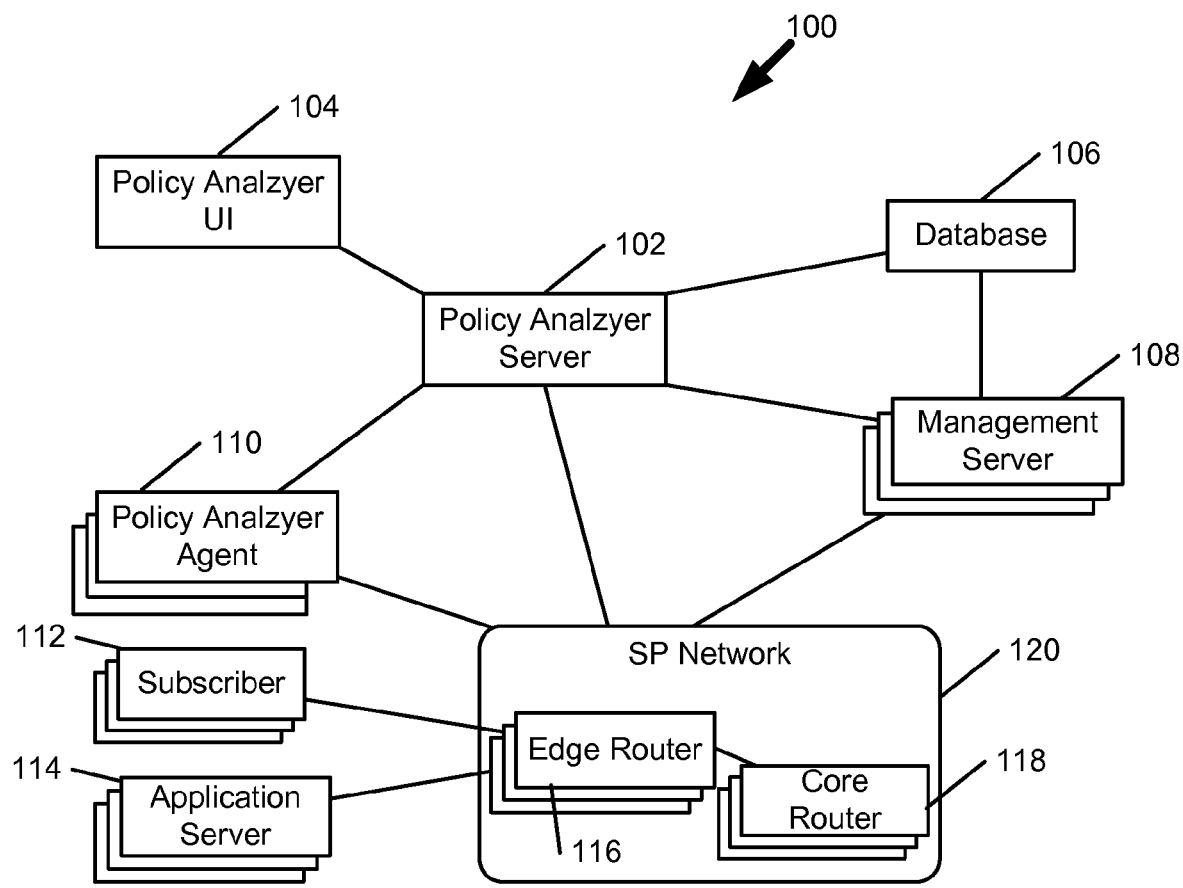
FIG. 1 illustrates an exemplary system consistent with principles of the invention.

FIG. 1 illustrates an exemplary system 100 consistent with principles of the invention. Exemplary system 100 may include a policy analyzer server 102, a policy analyzer user interface 104, a database 106, one or more management servers 108, policy analyzer agents 110, subscriber devices 112, application servers 114, and a service provider network 120, including edge routers 116 and core routers 118.

Policy analyzer user interface 104 may be, for example, a browser that communicates with policy analyzer server 102 via a network. Alternatively, policy analyzer user interface 104 may be a terminal emulator directly connected to policy analyzer server 102 to communicate with policy analyzer server 102 via an asynchronous interface. Policy analyzer user interface 104 provides a user, such as a network designer, a way to interact with policy analyzer server 102.

Policy Analyzer user interface 104 may be capable of masking and layering analysis results for a display. Since the policy analysis result may be complicated and a large amount of information may be provided, policy analyzer user interface 104 may obtain input from a user about specific aspects of analysis that the user wants displayed. Each display may be modeled as a layer with a given mask. Multiple layers may be displayed together resulting in a union operation of the layers.

Policy analyzer server 102 interfaces with policy analyzer user interface 104, which may provide information to policy analyzer server 102 regarding an analysis request. Policy analyzer server 102 may send analysis results via policy analyzer user interface 104 for display to a user. Policy analyzer server 102 may interface with one or more management servers 108 and database 106 to retrieve policy rules (PRs), service definitions, subscriber definitions and a network definition. Further, policy analyzer server 102 may interface with one or more policy analyzer agents 110 to cause traffic to be injected into service provider network 120 and to measure flow of injected traffic. Policy analyzer server 102 may also interface with one or more devices in service provider network 120 to obtain network data, which may include information regarding a state of a device and PRs installed for a subscriber.

Management servers 108 include active subscriber, service and policy definitions pertaining to service provider network 120. Management servers 108 may also provide policy, service and network data pertaining to a particular subscriber to policy analyzer server 102 when requested by policy analyzer server 102. Management servers 108 may further be responsible for downloading policy rules to appropriate routers in order to manage network traffic.

Database 106 may include one or more databases having policy rule definitions, service definitions, subscriber definitions and network definitions. Database 106 may be accessed by management servers 108 and policy analyzer server 102.

Service provider network 120 may represent a network including edge routers 116 and core routers 118. Edge routers are located at edges of network 120 near end users, such as subscribers 112 and application servers 114. Core routers 118 are located at intermediate locations within a network, such as service provider network 120. Core routers 118 may handle network traffic from several routers and typically have more high volume routing, but coarser grained policy control capability than those included in edge routers 116.

Policy analyzer agents 110 may be included in various network components, such as edge routers 116, core routers 118 and other devices, as well as in users' devices, such as in software in a subscriber's personal computer (PC), or in software in an application server. Policy analyzer agents 110 act on behalf of policy analyzer server 102 and may perform such functions as data injection, monitoring and statistics collection. Different policy analyzer agents 110 may have different capabilities. Therefore, a subscriber's PC with special policy analyzer agent 110 software installed may be capable of performing injection, monitoring and statistics collecting services, a core router 118 may only be capable of providing monitoring and statistics collection services and an edge router 116 may only be capable of injecting certain types of packets, for example Internet Control Message Protocol (ICMP) packets.

Subscriber devices 112 refers to subscribers' network devices, such as personal computers, handheld computing devices, or any other device capable of sending and receiving information via a network.

Application server 114 provides services, such as, movies, video teleconferencing, voice communications, data, web pages, and the like.

Network Operation

Default policy rules and services may be defined for a subscriber based on a type of subscriber device 112 and a type of connection. For example, a subscriber accessing service provider network 120 via a dialup line, would typically not have default services defined that require broadband network access, such as video-on-demand.

A subscriber may also attempt to access a service that is a not a default service. In such a case, management servers 108 may determine, based on the subscriber and service definitions stored in database 106, whether subscriber 112 is a subscriber to the service. For, example, the service definition and the subscriber definition may indicate that subscriber device 112 may be authorized to use a particular service when the subscriber agrees to pay for the service.

FIG. 2 illustrates exemplary policy rules (PRs) stored in database 106 that may define a service for a subscriber, such as a "gold" service. Gold service, in this example, is defined as PR1 and PR2. PR1 has a precedence of 30 and rate limits all File Transfer Protocol (FTP) traffic to 64 kilobits per second. PR2 has a precedence of 10 and forwards video teleconferencing traffic. In exemplary system 100, policy rules may have a precedence or priority. The lower the precedence number, the higher the priority. For example, PR2 has a higher priority than PR1 because PR2 has a lower precedence number, 10, than PR1, which has a precedence number of 30. Although this example shows higher precedence numbers as indicating lower priorities, a system may be implemented such that higher precedence numbers indicate higher priorities. In some implementations, precedence is used only when the PRs have conflicting actions.

As can be seen from this example, each PR includes a condition and an action. In PR1, the condition is FTP traffic and the action is rate limit to 64 kbps. In PR2, the condition is video teleconferencing traffic and the action is forward. When traffic satisfies or matches conditions of more than one policy, one policy has a higher priority (lower precedence number) than the other matching policies and the actions cannot be combined, then the other matching policies are said to be eclipsed or overridden by the policy with the higher priority.

A particular router may define a set of eclipsing PRs for that router. The eclipsing PRs indicate incompatible PR actions. That is, if a packet satisfies conditions of multiple PRs and the corresponding PR actions are defined to be incompatible, then the router implements the highest priority PR and the corresponding action is taken. The PRs pertaining to the other actions are overridden or eclipsed. For example, a router may define each of the following pairs of actions as incompatible (eclipsing rules): Forward/Forward, Forward/Filter, Forward/Nexthop, Filter/Filter, Filter/Nexthop, Filter/Mark, Filter/RateLimit, Nexthop/Nexthop, Nexthop/Mark, Nexthop/RateLimit, and RateLimit/RateLimit. The actions may be defined as incompatible because performing both actions may not be possible or may not make sense. For example, it is senseless to have an action for rate limiting traffic to 64 kbps and for rate limiting the same traffic to 50 kbps simultaneously on a same router. Similarly, it may not be possible to filter traffic and to forward the same traffic on the same router.

Similarly, a particular router may have combination PR actions defined, which indicate actions that are compatible and can be combined. A combination rule indicates an order of performing actions when a packet matches more than one PR condition, regardless of the precedence or priority of the PRs. For example, a router may have the following combination PR actions defined (the second action of each pair is to be performed first): Forward/Mark, Forward/RateLimit and RateLimit/Shape with a Quality of Service (QoS). Thus, for example, suppose that a packet satisfies two PRs, PR1 and PR2. Assume PR1 has a higher priority than PR2 and an action for PR1 is Forward and an action for PR2 is RateLimit. The combination rule, in this example, defines this combination as compatible and indicates that RateLimit is to be performed first. Therefore, the action, RateLimit, will be performed first and the action, Forwarding, will be performed next, regardless of policy rule priority or precedence.

Management server 108 dynamically retrieves default policy and service definitions for subscribers from database 106 and downloads the definitions to appropriate routers 116 and/or 118 when an interface between subscriber's device 112 and router 116 is established and based on subscriber dynamic service activation requests. For example, for a Digital Subscriber Line (DSL) subscriber, this may occur when a point-to-point protocol over Ethernet (pppoe) session is started. Default policy rules and services may be determined based on policy rules, service definitions, subscriber definitions and a network definition. Further management server 108 may download additional policies to appropriate routers when a subscriber is authorized to activate and access a non-default service.

Figure 3:
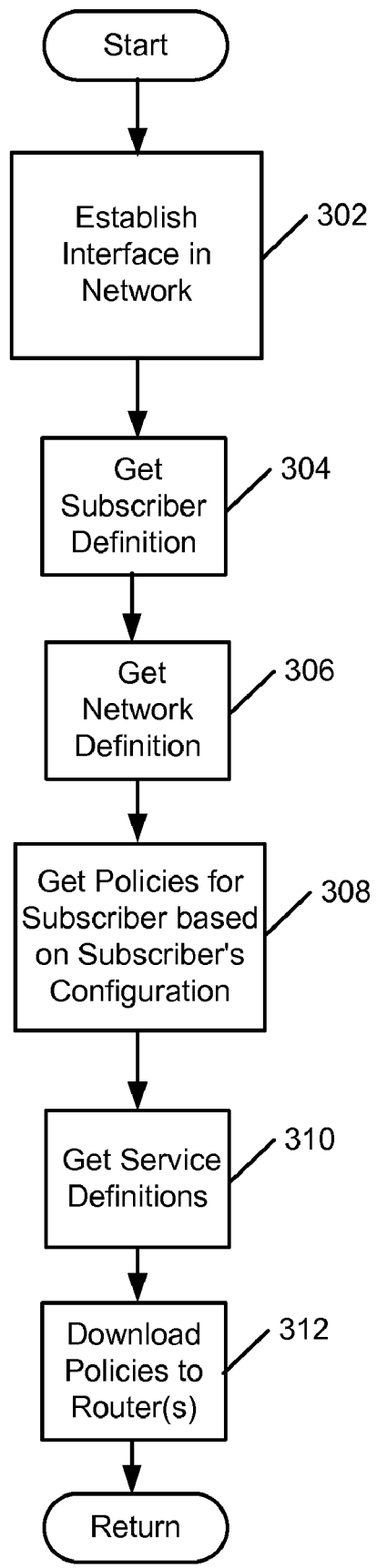
FIG. 3 is a flowchart that illustrates an exemplary process in a management server.

FIG. 3 is a flowchart that illustrates an exemplary process associated with management server 108 downloading default PRs and service policies to appropriate routers. One of subscriber devices 112 establishes an interface to service provider network 120 via, for example, a pppoe session. Router 116 may inform one of management servers 108 of the established interface (act 302). The management server may then retrieve a subscriber definition for a subscriber using the subscriber device (act 304). The definition may be stored in database 106 and may include type of subscriber equipment, type of connection and a list of services to which the subscriber subscribes.

The management server retrieves a network definition from database 106 (act 306). The network definition may include a configuration of service provider network 120, such as equipment types, location of equipment within source provider network 120, network addresses of equipment, versions of software loaded and executing in equipment and the like.

Next, the management server may then retrieve, from database 106, policy definitions (act 308) and, service definitions defined for the subscriber device, based on the subscriber's definition and configuration (act 310). For example, a service requiring a high bandwidth will not be defined for the subscriber when the subscriber device is accessing the network via a low-speed dialup connection. The management server may then download the service and policy rule definitions to one or more routers 116, 118 for installation (act 312).

When the subscriber attempts to access a non-default service, the management server may then retrieve the subscriber definition, the network definition and the service definition from database 106. If the subscriber is authorized to use the service, and the service is compatible with the subscriber device, based on subscriber's definition, then the management server downloads the PRs that are defined for the service to appropriate routers 116 and/or 118 for installation on the routers.

System Components

Figure 4:
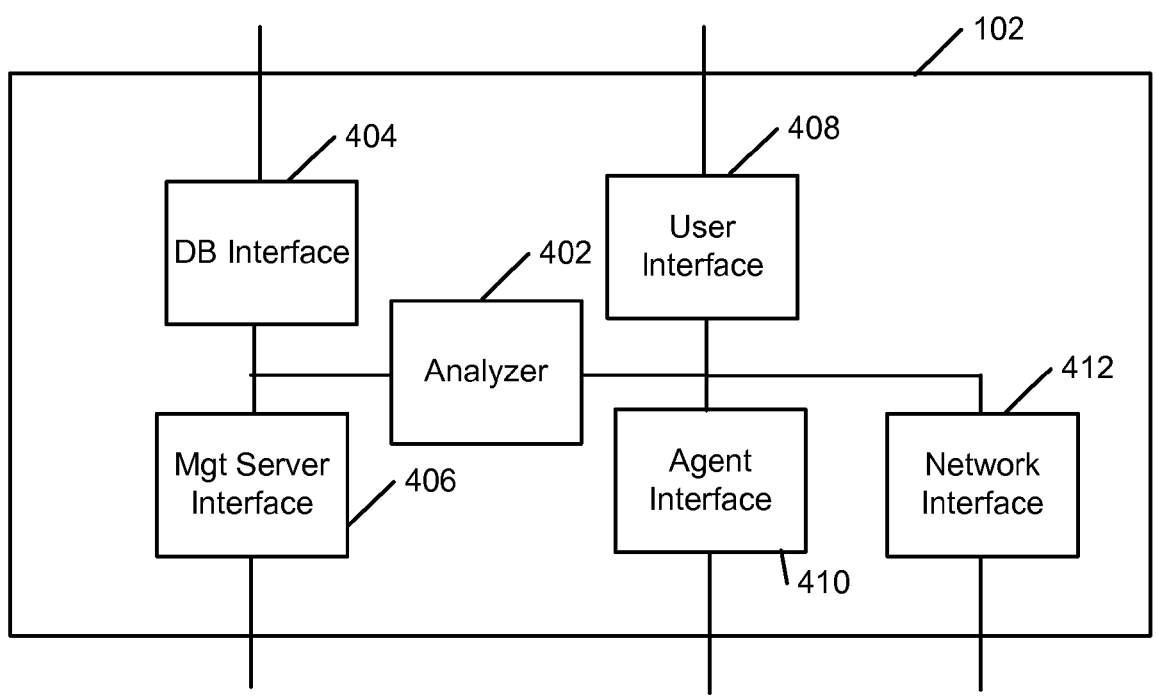
FIG. 4 is a functional block diagram of an exemplary policy analyzer server.

FIG. 4 is a functional block diagram of an exemplary policy analyzer server 102. Policy analyzer server 102 includes an analyzer 402, a database interface 404, a management server interface 406, a user interface 408, an agent interface 410 and a network interface 412.

Analyzer 402 analyzes possible packet input using PRs and service definitions defined for a subscriber. The active service definitions used by analyzer 402 are based on a configuration and given service requests of subscriber devices 112.

Database interface 404 is configured to retrieve definitions from database 106. Such definitions include policy rule definitions, service definitions, subscriber definitions and a network configuration.

Management server interface 406 is configured to request and retrieve information from management servers 108, such as active policy rules, active service definitions for a subscriber, and equipment configuration of subscriber device 112.

User Interface 408 is configured to receive input, such as an analysis request, from policy analyzer user interface 104 and output information, such as analysis results, to policy analyzer user interface 104.

Agent interface 410 is configured to send commands to policy analyzer agents 110 and receive information, such as collected statistics, from policy analyzer agents 110.

Network interface 412 is configured to send and receive information to and from devices in service provider network 120, such as routers 116, 118.

Figure 5:
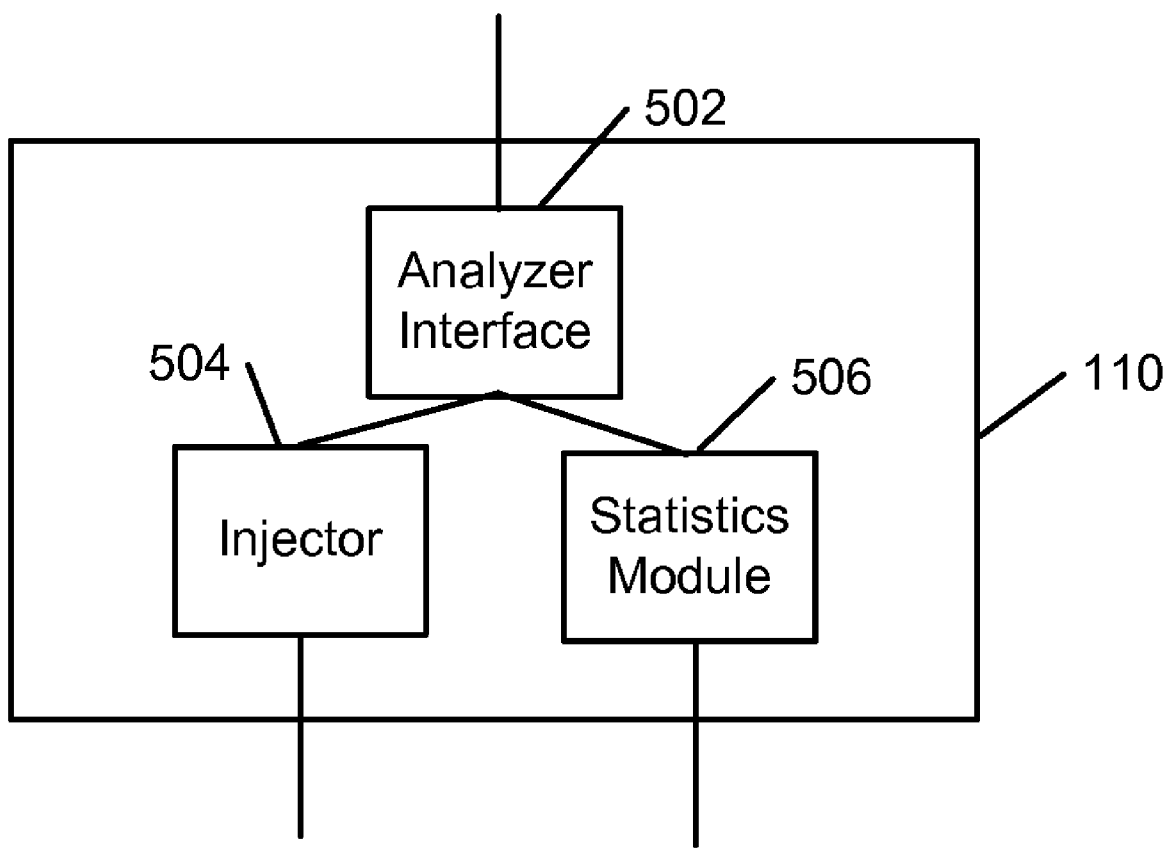
FIG. 5 is a functional block diagram of an exemplary policy analyzer agent.

FIG. 5 is a functional block diagram of exemplary policy analyzer agent 110. Policy analyzer agent 110 includes analyzer interface 502, injector 504 and statistics module 506.

Analyzer interface 502 may be configured to receive commands, such as an inject traffic command, from policy analyzer servers 102. The command may include a type of packet to inject, a packet schedule, indicating a time for injecting packets, and a packet rate. Analyzer interface 502 may further be configured to send information, such as collected statistics to one or more policy analyzer servers 102 for possible consolidation of the statistics from a group of policy analyzer agents 110.

Injector 504 may be configured to inject traffic into a service provider network 120 based on information provided from policy analyzer servers 102. The information from policy analyzer servers 102 may include a type of packet, a packet schedule, indicating a time for injecting packets, and packet rate.

Statistics module 506 may be configured to monitor injected traffic by, for example, incrementing traffic counters, measuring packet throughput, measuring network delay, counting a number of dropped packets and the like.

Although FIG. 5 shows policy analyzer agent 110 having both injector 504 and statistics module 506, some implementations of policy analyzer agent 110 may have injector 504, but not statistics module 506. Further, other implementations of policy analyzer agent 110 may have statistics module 506, but not injector 504.

Figure 6:
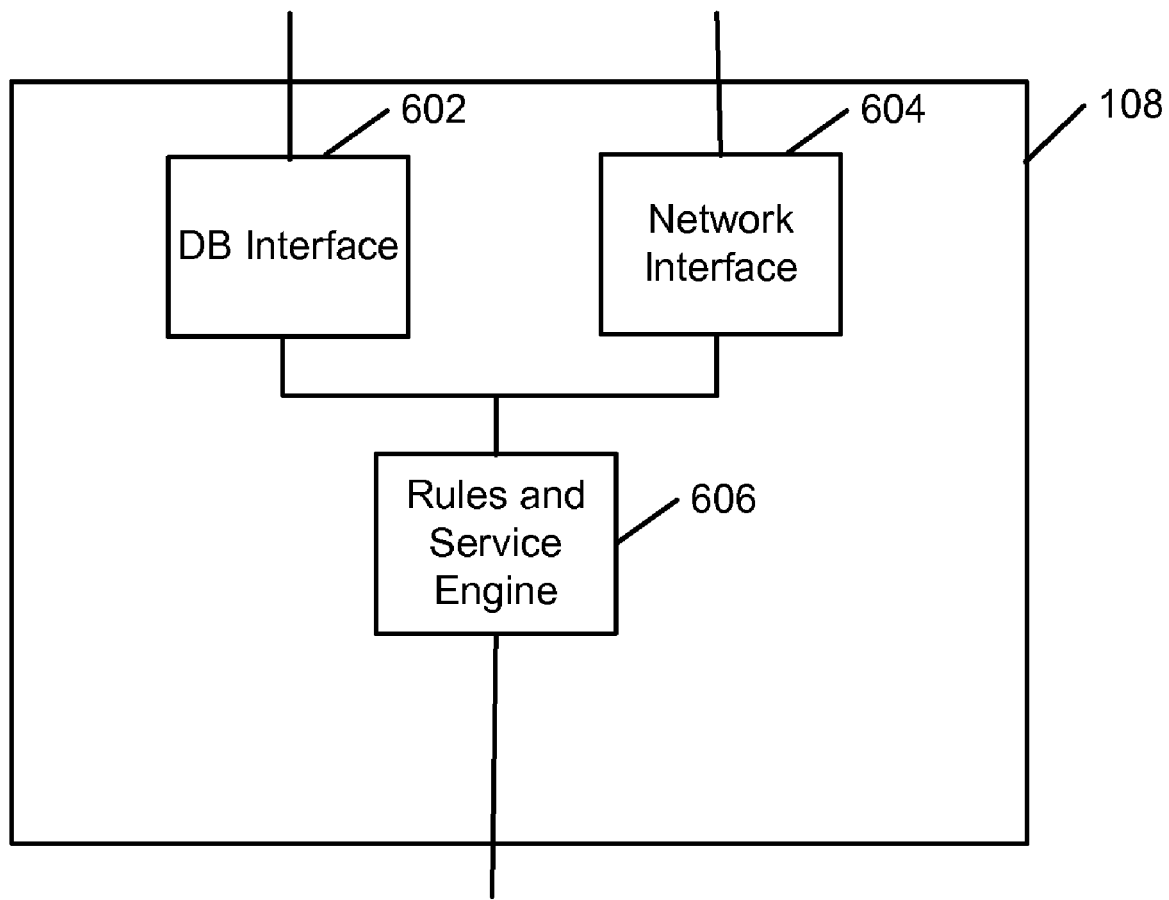
FIG. 6 is a functional block diagram of an exemplary management server.

FIG. 6 is a functional block diagram of management server 108. Management server 108 may include a database interface 602, a network interface 604 and a rules and service engine 606.

Database interface 602 provides access to database 106 so that management server 108 may access PR definitions, service definitions, subscriber definitions, network definitions and router definitions.

Network interface 604 provides management server 108 with an interface for downloading policy rules and network definitions to network devices, such as routers 116 and 118.

Rules and service engine 606 is configured to analyze policy rule definitions, subscriber definitions and service definitions for a subscriber, determine which policy definitions and service definitions are to be active based on the subscriber definitions, and download the active definitions to appropriate routers 116 and 118.

Policy Analyzer

Analysis

Policy analyzer user interface 104 may allow a user, such as a network designer, to interface with policy analyzer 102 and enter information for policy analyzer analysis. For example, the network designer may enter information indicating that default policies and services pertaining to a particular subscriber are to be analyzed. Further, the network designer may enter information regarding a "what if" analysis, which will be described in detail below.

Figure 7:
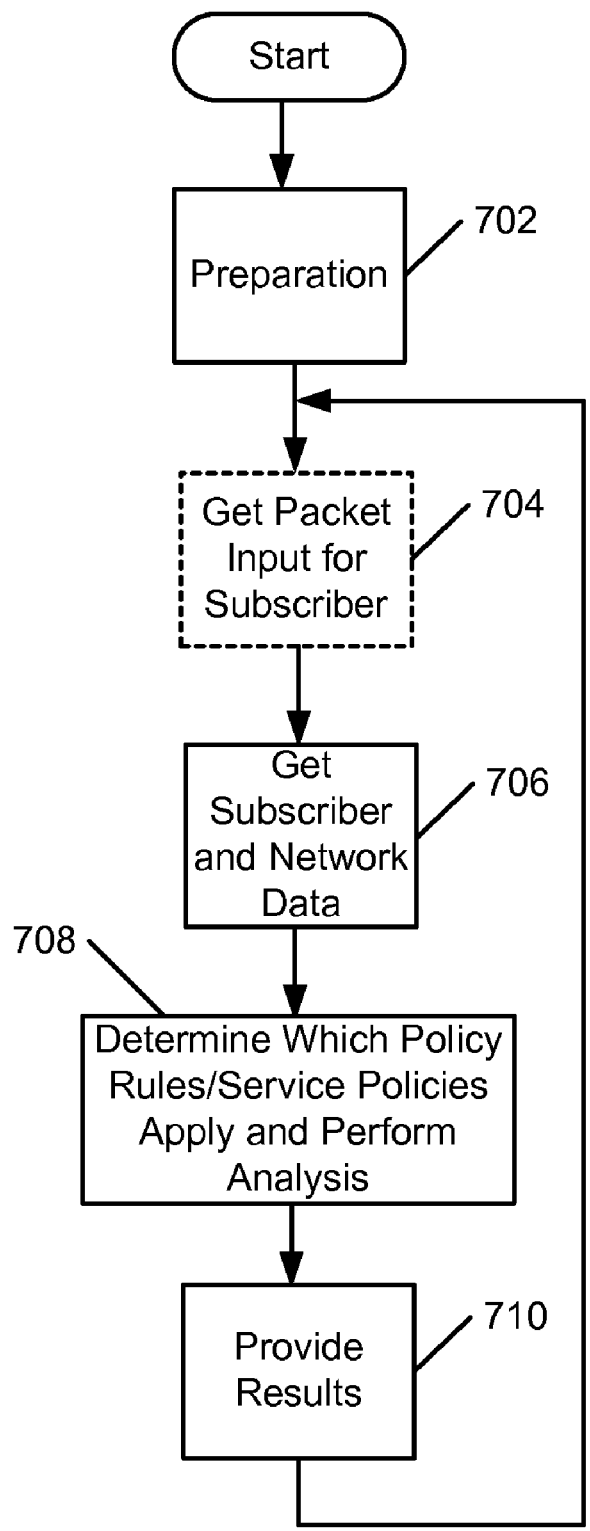
FIG. 7 is a flowchart that illustrates processing in an exemplary policy analyzer server.
Figure 8:
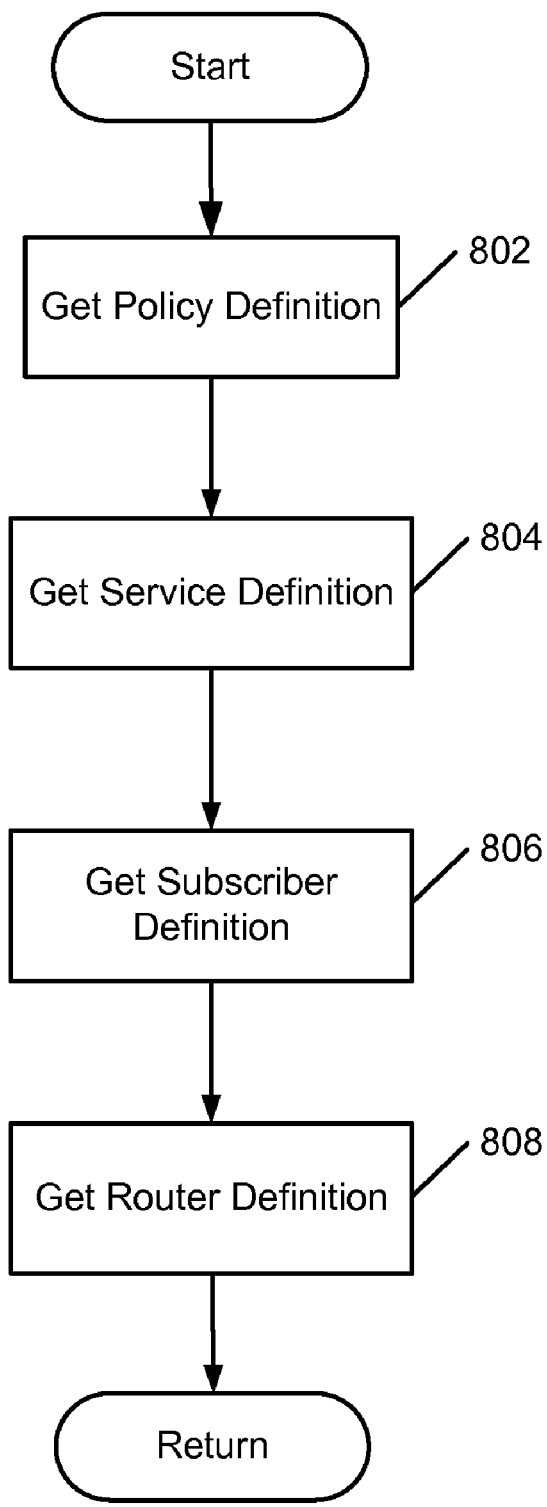
FIG. 8 is a flowchart that illustrates exemplary processing associated with initial preparations by policy analyzer server.

FIG. 7 is a flowchart that illustrates exemplary operation of policy analyzer server 102. Policy analyzer server 102 may perform initial preparation (act 702). For example, FIG. 8 is a flowchart that illustrates exemplary actions associated with act 702. Referring to FIG. 8, policy analyzer server 102 retrieves PR definitions from database 106 (act 802). Policy analyzer server 102 may also retrieve service definitions from database 106 (act 804). The service definitions include one or more PRs. Next, policy analyzer server 102 may retrieve a subscriber definition from database 106 (act 806). The subscriber definition includes a type of equipment and technology used by subscriber device 112 and a list of services to which a subscriber subscribes. Policy analyzer server 102 also retrieves a router definition pertaining to edge router 116 with which the subscriber communicates (act 808). The router definition may include a router type and software version as well as combination rules and eclipsing rules.

Returning to FIG. 7, policy analyzer server 102 optionally receives packet input for analysis (act 704) and retrieves subscriber and network definitions for analysis (act 706). The packet input may be used for "what if" analysis, described in detail below. Policy analyzer server 102 may also determine which policy rules and service policies to apply based on service, subscriber and network definitions, defined in database 106 (act 708). Policy analyzer server 102 also generates results based on the analysis (act 710). Policy analyzer server 102 may store the results on a machine-readable medium and/or may provide the results to policy analyzer user interface 104 for display to the user, as described in more detail below.

Figure 9:
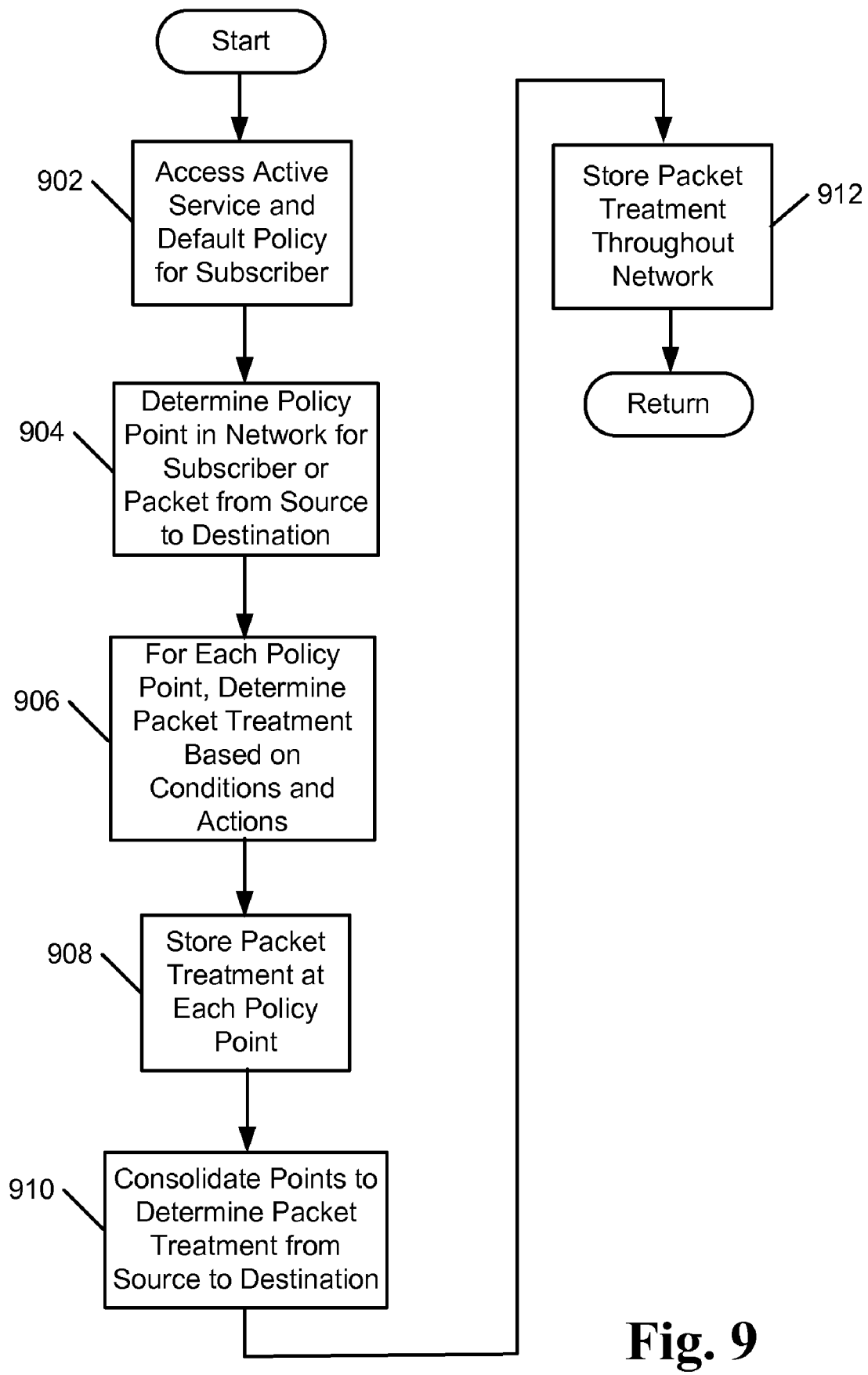
FIG. 9 is a flowchart that illustrates exemplary analysis processing.

For example, FIG. 9 is a flowchart that illustrates an exemplary analysis process associated with determining which policy rules and services to apply, that takes place within policy analyzer server 102. Policy analyzer server 102 accesses active service policies and default policy definitions defined for a subscriber (act 902). Policy analyzer server 102 may have retrieved this information from database 106 during initial preparation (act 702:FIG. 7). Alternatively, service definitions and policy rules currently loaded in routers 116 and 118 for the subscriber may be retrieved from management servers 108. Policy analyzer 102 may determine one or more policy points in the network based on the retrieved definitions (act 904). A policy point is a point, such as at one of edge routers 116 or one of core routers 118 where packet behavior or treatment will be analyzed. Locations of policy points may be available in a service definition. For example, a gold gaming service, which may be a set of policy rules that define the service, may have two policy points defined: 1) on a subscriber access point and 2) on a game service access point. In many cases, policy analyzer server 102 may determine only a single policy point. For each determined policy point, policy analyzer server 102 determines packet treatment based on active policy definitions, eclipsing rules and combination rules (act 906).

Figure 10:
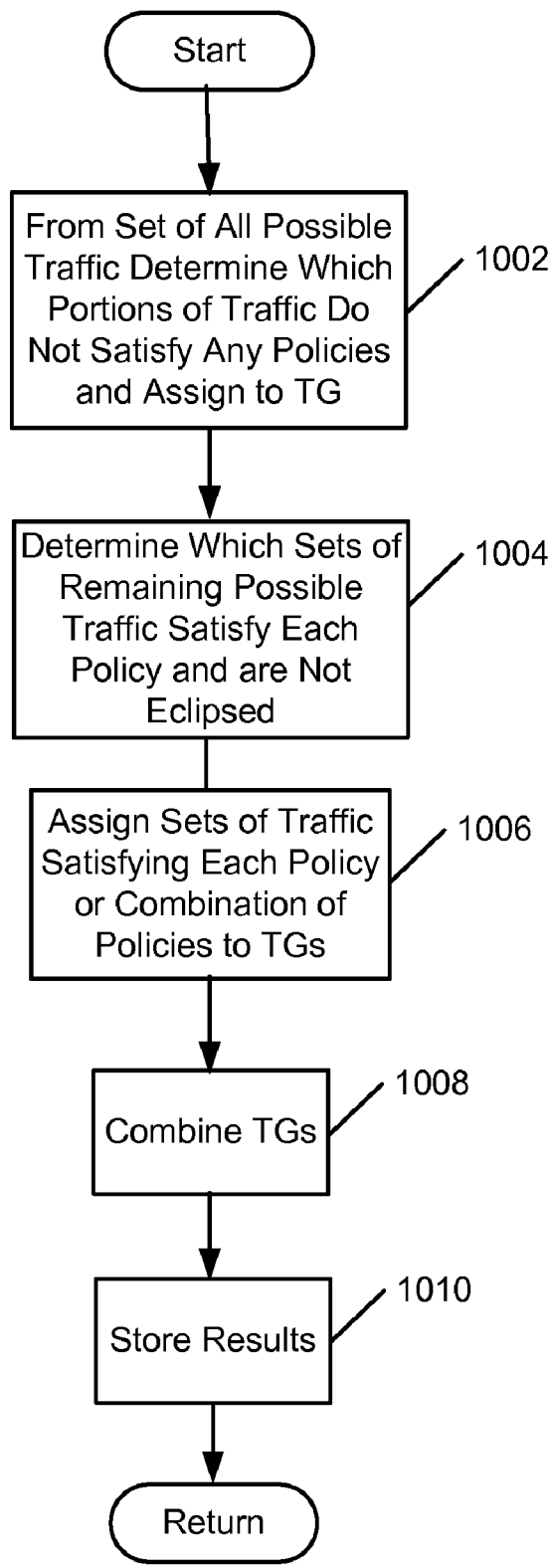
FIG. 10 is a flowchart illustrating exemplary processing associated with determining traffic groups.

For example, FIG. 10 is a flowchart that illustrates the process of determining packet treatment based on active policy definition. FIG. 10 assumes that all PRs pertaining to a subscriber are to be analyzed and resulting traffic groups are to be determined. Analysis of all possible traffic and the PRs result in one or more traffic groups. A traffic group may represent a least common denominator of traffic that pertains to a PR or a group of PRs, as described in more detail below.

Policy analyzer server 102 may determine whether there is a portion of all possible traffic that does not satisfy any PR conditions (act 1002). If so, that portion of the traffic may be assigned to a traffic group (TG). From the remaining possible traffic, policy analyzer 102 may determine which policy condition or groups of PR conditions are satisfied and not eclipsed (act 1004). Policy analyzer server 102 may assign each portion of the remaining possible traffic to a respective TG based on the PR condition or conditions satisfied by the corresponding portion of traffic (act 1006). Policy analyzer server 102 may combine all portions of traffic into appropriate traffic groups (act 1008) and policy analyzer server 102 may store analysis results for later display (act 1010).

Returning to FIG. 9, policy analyzer server 102 may store results pertaining to packet treatment at each policy point for later display (act 908). Policy analyzer server 102 may also consolidate and correlate information pertaining to packet treatment at each policy point in order to determine packet treatment from source to destination (act 910). Policy analyzer server 102 may store the analysis results, which may show end-to-end packet treatment (act 912).

The processes described above are illustrated with an example below. Suppose exemplary PRs of FIG. 11 are defined for a subscriber. PR1 is defined to rate limit FTP traffic at 64 kilobits per second and has a precedence of 30. PR2 has a precedence of 20 and is defined to forward web traffic. PR3 has a precedence of 10 and is defined to forward Internet Service Provider (ISP) content server traffic. PR4 has a precedence of 100 and is defined to filter any traffic. Further, assume one policy point at an edge router 116 near subscriber device 112.

Referring to FIG. 10, policy analyzer server 102 determines which portions of traffic, if any, do not satisfy any of the PRs (act 1002). In this example, because all of the PRs pertain to some traffic, there is no portion of traffic that does not satisfy any of the policy rules.

Next, policy analyzer sever 102 determines which sets of remaining possible traffic satisfy one or more PRs (act 1004). In this example, FTP traffic satisfies PR1, web traffic satisfies PR2, ISP content server traffic (e.g., traffic pertaining to address 10.10.10.0/24) satisfies PR3, and any traffic satisfies PR4.

Considering the priorities or precedence and assuming that the PR actions may eclipse one another according to eclipsing rules for a router, PR3 has the highest priority (lowest precedence number), followed by PR2, PR1, and then PR4. All ISP content server traffic from address 10.10.10.0/24 has the highest priority. Therefore, policy analyzer server 102 assigns all ISP content traffic (including FTP and www traffic) to TG3 (act 1006). PR2 has the next highest priority. Therefore, policy analyzer server 102 assigns all www traffic that is not from 10.10.10.0/24 to TG1 (act 1006). PR1 has the next highest priority. Therefore, policy analyzer server 102 assigns all FTP traffic that is not from 10.10.10.0/24 to TG1. The remaining traffic, (i.e., all traffic that is not FTP or www traffic and not from 10.10.10.0/24) is assigned by policy analyzer server 102 to TG4.

Although TG1 satisfies PR1, TG2, satisfies PR2, TG3 satisfies PR3 and TG4 satisfies PR4, the different traffic groups may also be assigned in a different order, such that, for example, TG4 matches PR1, TG3 matches PR2, TG2 matches PR3 and TG1 matches PR4.

Policy analyzer server 102 may combine the four traffic groups, if necessary (act 1008). In this example, the traffic groups do not require combining because only four types of traffic are assigned to TGs, one type of traffic for each TG. Policy analyzer server 102 may store the results for later display (act 1010).

The output of the above analysis may be displayed to the user via policy analyzer user interface 104. FIG. 12 illustrates exemplary results of the above analysis providing information about the four resulting TGs and the policies PRs satisfied by each traffic group. As illustrated in FIG. 12, each traffic group, corresponding description and policy rules with matching conditions are provided to a user, such as a network designer.

Another example is provided using addresses. FIG. 13 illustrates policies for this example. Referring to FIG. 13, PR1 is satisfied when 24 bits of a 32 bit source address match 10.10.10.0. That is, this PR covers all addresses from 10.10.10.0-10.10.10.255. PR2 is satisfied when 24 bits of the source address match 20.20.20.0. That is, PR2 covers all source addresses from 20.20.20.0-20.20.20.255. PR3 is satisfied when 16 bits of the source address match 10.10.0.0. That is, PR3 covers all addresses from 10.10.0.0-10.10.255.255.

Referring back to FIG. 10, policy analyzer server 102 determines portions of traffic, if any, that do not satisfy any of the PR conditions (act 1002). In this example, traffic from source addresses in a range of 0.0.0.0-10.9.255.255, 10.11.0.0-20.20.19.255, and 20.20.21.0-255.255.255.255 satisfy none of the PR conditions. Source address range 10.10.10.0-10.10.10.255 satisfies the condition of PR1, source address range 20.20.20.0-20.20.20.255 satisfy the condition of PR2 and source address range 10.10.0.0-10.10.255.255 satisfy the condition of PR3.

FIG. 14 illustrates the entire address range and PRs satisfied by each address range. As shown in FIG. 14, address range 0.0.0.0-10.9.255.255 does not satisfy any policy rule conditions, address range 10.10.0.0.-10.10.9.255 satisfies the condition of PR3, address range 10.10.10.0-10.10.10.255 satisfies the conditions of PR 1 and PR3, address range 10.10.11.0-10.10.255.255 satisfies the condition of PR3, address range 10.11.0.0-20.20.19.255 does not satisfy any policy rule conditions, address range 20.20.20.0-20.20.20.255 satisfies the conditions of PR2 and address range 20.20.21.0-255.255.255.255 does not satisfy any policy rule conditions.

Policy analyzer server 102 determines which sets of remaining traffic satisfy conditions of PRs (FIG. 13) and assigns the sets of traffic to traffic groups (acts 1004, 1006), as shown in FIG. 15.

Policy analyzer server 102 combines the results to form traffic groups as shown in FIG. 16 (act 1008). FIG. 16 shows the resulting four traffic groups, their address ranges and the PRs satisfied by each TG. Policy analyzer server 102 may store results (act 1010).

Figure 17:
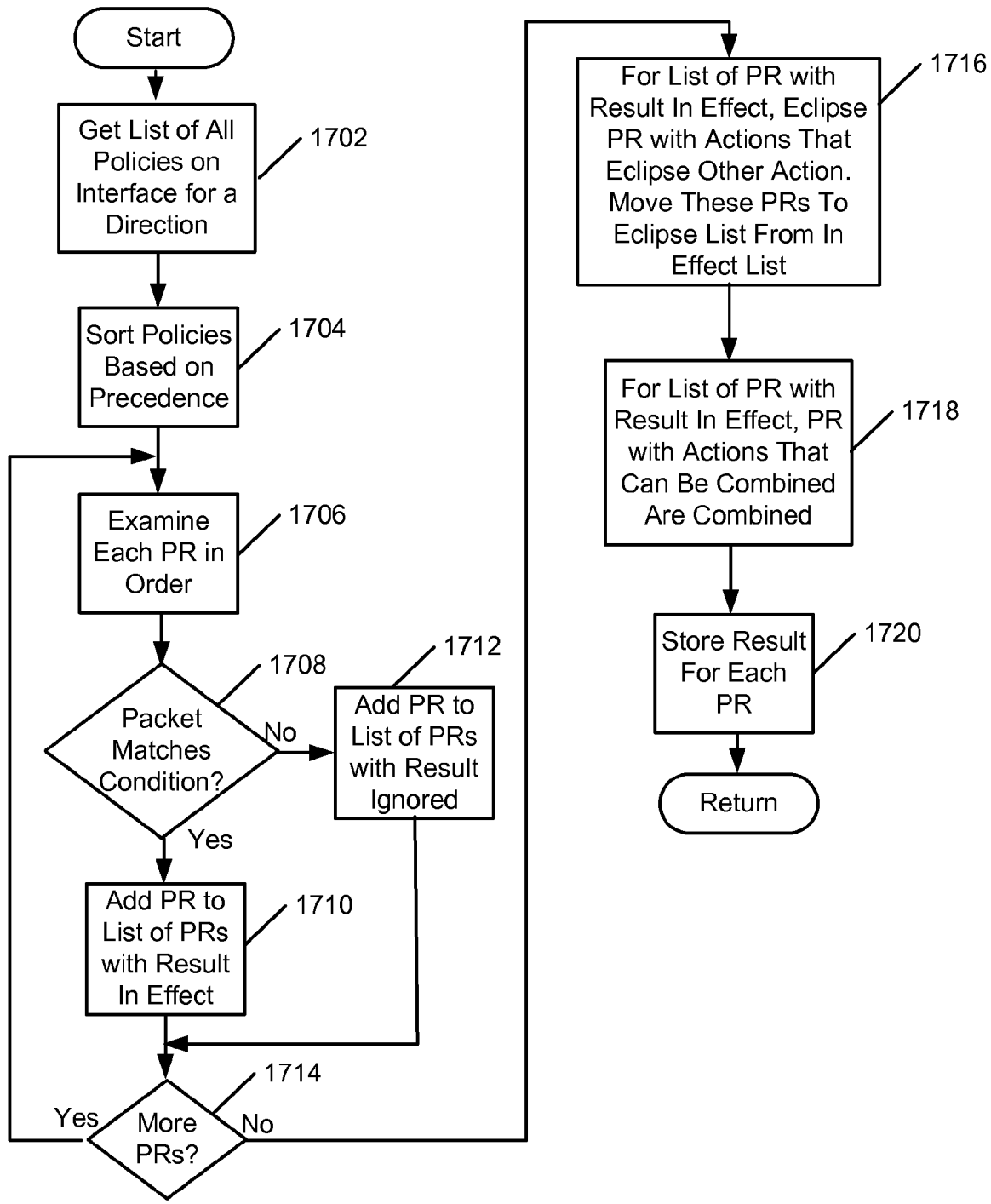
FIG. 17 is a flowchart illustrating details of an exemplary "what if" analysis.

Referring back to FIG. 9, policy analyzer server 102 may determine packet treatment based on conditions and actions (act 906). FIG. 17 is a flowchart that illustrates processing by policy analyzer server 102 when performing a "what if" analysis to determine packet treatment at a policy point. Policy analyzer server 102 obtains a list of all PRs on an interface for a particular direction (act 1702). The directions are ingress and egress. Ingress pertains to incoming data and egress pertains to outgoing data. Policy analyzer 102 may obtain the PRs for a particular subscriber from management server 108. Policy analyzer server 102 may also obtain the PRs for a particular subscriber's traffic from routers 116, 118.

Policy analyzer server 102 sorts the PRs based on precedence (act 1704). Assuming that a low precedence number indicates a high priority, the sorted order may be from a low to a high precedence number. In other implementations, the sorted order may be from a high precedence number to a low precedence number.

Each PR is examined in order (act 1706). For each PR being examined, policy analyzer server 102 determines whether a given packet matches the PR condition (act 1708). If the packet matches a PR condition, the PR is added to a list of PRs that are "in effect" (act 1710). Otherwise, the PR is added to a list of PRs that are "ignored" (act 1712). Policy analyzer server 102 may also determine whether any more PRs are to be examined. If so, then policy analyzer server 102 returns to act 1706 and repeats the process.

If no more PRs are to be examined, the list of PRs that are "in effect" will be examined to determine whether any of the actions are eclipsed by other actions (act 1716). All PRs that are eclipsed, if any, are then moved to an "eclipsed" list. For example, policy analyzer server 102 may compare the actions in the "in effect" list to determine whether they appear in the eclipsing rules for the particular router 116, 118. If so, the PR that appears first eclipses other PRs. Thus, because the PRs are examined in priority order, a higher priority PR may eclipse a lower priority PR.

If two PRs are conflicting and have the same precedence, the policy analyzer server 102 may flag the PRs as invalid PRs and move them to an 'invalid' list. In another implementation, policy analyzer server 102 may issue a "warning". In yet another implementation, policy analyzer server 102 may use a network device definition to determine the PR that is eclipsed. If the network device definition indicates to policy analyzer server 102 that the behavior is not deterministic, policy analyzer server 102 tags both PRs as 'in effect with warning'. In this case, a configuration order of sending the PRs to the router by management server 108 for a subscriber determines the PR that is eclipsed.

Policy analyzer server 102 may combine all actions that can be combined from the list of "in effect" PRs (act 1718). For example, "Mark" and "Forward" may be combined if they appear in the router's combination list. The PRs are combined according to a defined order of actions in the combination rules, regardless of precedence number. The results for each PR may then be stored (act 1720) and may be displayed (act 710:FIG. 7).

The above processing associated with FIG. 17 is illustrated by the following example. Suppose the "what if" analysis concerns a subscriber, Joe, sending packet A1 and packet A2, the edge router 116 is Juniper E-Series 5.0, Joe has a Point-to-Point Protocol (PPP) default policy, active services are be512, cp1 and cp2, direction is ingress and user IP address is 10.10.10.10. The default policy may be modeled as a special type of service with a special service session. FIG. 18 shows the service sessions, PR name, precedence, source, destination action, and analysis for this example.

Policy analyzer server 102 determines all PRs governing a policy point for the subscriber in a direction. For the ingress direction, the result is To_cp1, To_cp2, To_SAE, Internet, Cp1, and Cp2.

Policy analyzer server 102 may also sort the list of PRs based on precedence number (lowest to highest). In this example, the result is Cp1, Cp2, To_cp1, To_cp2, Internet, and To_SAE.

Policy analyzer server 102 examines each PR in order. First, policy analyzer server 102 examines packet A1 with regard to the PRs. Policy analyzer server 102 determines that packet A1 matches the condition for PR Cp1. That is, packet A1 has cp1 as its destination. Policy analyzer server 102 adds PR Cp1 to the "in effect" list. Policy analyzer server 102 determines that more PRs are to be examined.

PR Cp2 is selected for examination with respect to packet A1. Policy analyzer server 102 determines that packet A1 does not match the condition of Cp2, which is a packet having a destination of cp2. Policy analyzer server 102 adds PR Cp2 to the "ignore" list. Policy analyzer server 102 determines that there are more PRs to examine.

The analysis continues with PR To_cp1, which requires a packet with a destination of cp1 for a match. Because packet A1 satisfies this condition, policy analyzer server 102 adds PR To_cp1 to the "in effect" list. Policy analyzer server 102 determines that there are more PRs to examine.

Policy analyzer 102 examines PR To_cp2. Policy analyzer server 102 determines that packet A1 does not match the condition of PR To_cp2. Therefore, policy analyzer server 102 adds PR To_cp2 to the "ignore" list. Policy analyzer server 102 determines that there are more PRs to examine.

Policy analyzer server 102 next examines PR Internet, which requires a packet not having either a destination of cp1 or cp2. Policy analyzer server 102 determines that packet A1 does not match this condition. Therefore, policy analyzer server 102 adds PR Internet to the "ignore" list. Policy analyzer server 102 determines that there are more PRs to examine.

Policy analyzer server 102 next examines PR To_SAE, which requires a packet having a destination of SAE (Service Activation Engine or management servers 108). Policy analyzer server 102 determines that packet A1 does not match this condition. Therefore, policy analyzer server 102 adds PR To_SAE to the "ignore" list.

Policy analyzer server 102 determines that all PRs have been examined. In this example, the "in effect" list contains [Cp1 and To_cp1] and the "ignore" list includes [Cp2, To_Cp2, Internet, and To_SAE]. Policy analyzer server 102 analyzes the actions of the "in effect" PRs with respect to eclipsing rules for router ERX 5.0. For the purposes of this example, assume the following eclipsing rules: Forward/Forward, Forward/Filter, Forward/NextHop, Filter/Filter, Filter/NextHop, Filter/Mark, Filter/RateLimit, NextHop/NextHop, NextHop/Mark, NextHop/RateLimit, RateLimit/RateLimit, and RateLimit/Filter.

Examining PR Cp1, the corresponding action is RateLimitX. The corresponding action for PR To_cp1 is NextHop. The two actions are in the eclipsing rules, as can be seen above. Because the action, PR CP1 has a lower precedence number, the corresponding action, RateLimit, eclipses the action, NextHop, for PR To_cp1. Therefore, the corresponding PR To_cp1 is moved to the eclipsed list.

The list of PRs that are in effect are examined for actions that can be combined. Currently, the "in effect" list consists of [Cp1] and the eclipsed list consists of [To_Cp1]. Only one PR is in the "in effect" list. Therefore, a combination cannot take place. Had there been more than one PR in effect that could be combined, policy analyzer server 102 would update the "in effect" list by shifting the PRs according to the combination rules. The result is stored for each PR.

Policy analyzer server 102 performs the procedure again for packet A2, a packet to destination cp2. That is, policy analyzer server 102 retrieves the list of PRs defined for the subscriber using the interface for the ingress direction from management server 108.

Policy analyzer server 102 sorts the PRs based on precedence. The sorted PRs are [Cp1, Cp2, To_cp1, To_cp2, Internet, and To_SAE]. Policy analyzer server 102 examines each PR in order. First, policy analyzer server 102 examines PR Cp1 with respect to packet A2. The corresponding condition for PR Cp1 is a destination of cp1. Policy analyzer server 102 determines that packet A2 does not satisfy this condition. Therefore, policy analyzer server 102 adds PR Cp1 to the "ignore" list.

Policy analyzer server 102 determines that more PRs exist and examines PR Cp2. Policy analyzer server 102 determines that packet A2 matches the condition of PR Cp2, which is a packet with a destination of cp2. Policy analyzer server 102 adds PR Cp2 to the "in effect" list.

Policy analyzer server 102 determines that more PRs exist and performs act 1706 to examine PR To_cp1. Policy analyzer server 102 determines that packet A2 does not satisfy the condition of PR To_cp1, which is a packet with a destination of cp1. Policy analyzer server 102 adds PR To_cp1 to the "ignore" list.

Policy analyzer server 102 determines that more PRs exist and examines PR To_cp2. Policy analyzer server 102 determines that packet A2 satisfies the condition of PR To_cp2, which is a packet with a destination of cp2. Policy analyzer server 102 adds PR To_cp2 to the "in effect" list.

Policy analyzer server 102 determines that more PRs exist and performs act 1706 to examine PR Internet. Policy analyzer server 102 determines that packet A2 does not satisfy the condition of PR Internet, which is a packet with a destination of not cp1 and not cp2. Policy analyzer server 102 adds PR Internet to the "ignore" list.

Policy analyzer server 102 determines that more PRs exist and examines PR To_SAE. Policy analyzer server 102 determines that packet A2 does not satisfies the condition of PR To_SAE, which is a packet with a destination of SAE. Policy analyzer server 102 adds PR To_SAE to the "ignore" list.

Policy analyzer server 102 determines that no more PRs exist. At this point, the "in effect" list consists of [Cp2 and To_cp2] and the "ignore" list consists of [Cp1, To_cp1, Internet and To_SAE].

Policy analyzer server 102 examines the PRs in the "in effect" list to determine whether any actions are eclipsed. The corresponding actions of the PRs in the "in effect" list are [RateLimit and NextHop]. The two actions are in the eclipsing rules for the router, as can be seen above. Because the action, RateLimit, corresponds to PR Cp2, which has a lower precedence number than PR To_cp2, RateLimit eclipses the action, NextHop, of PR To_cp2. Therefore, the corresponding PR, To_cp2, is moved to the eclipsed list.

The list of PRs that are in effect are examined for actions that can be combined. Currently, the "in effect" list consists of [Cp2] and the eclipsed list consists of [To_Cp2]. Because only one PR is in the "in effect" list, no combination rules apply. As discussed above, had there been more than one PR in effect that could be combined, policy analyzer server 102 would update the "in effect" list by shifting the PRs according to the combination rules. The result is stored for each PR.

The results of the analysis may be displayed at policy analyzer user interface 104. FIG. 18 illustrates an exemplary display of the analysis results. As can be seen from FIG. 18, for packet A1, PR Cp1 is in effect, PR To_cp1 is eclipsed and PRs To_cp2, To_SAE, Internet and Cp2 are ignored. For packet A2, PR Cp2 is in effect, PR To_cp2 is eclipsed and the remaining rules are ignored. A network designer may use this information to determine how particular data/packets will be treated by service provider network 120.

Figure 19:
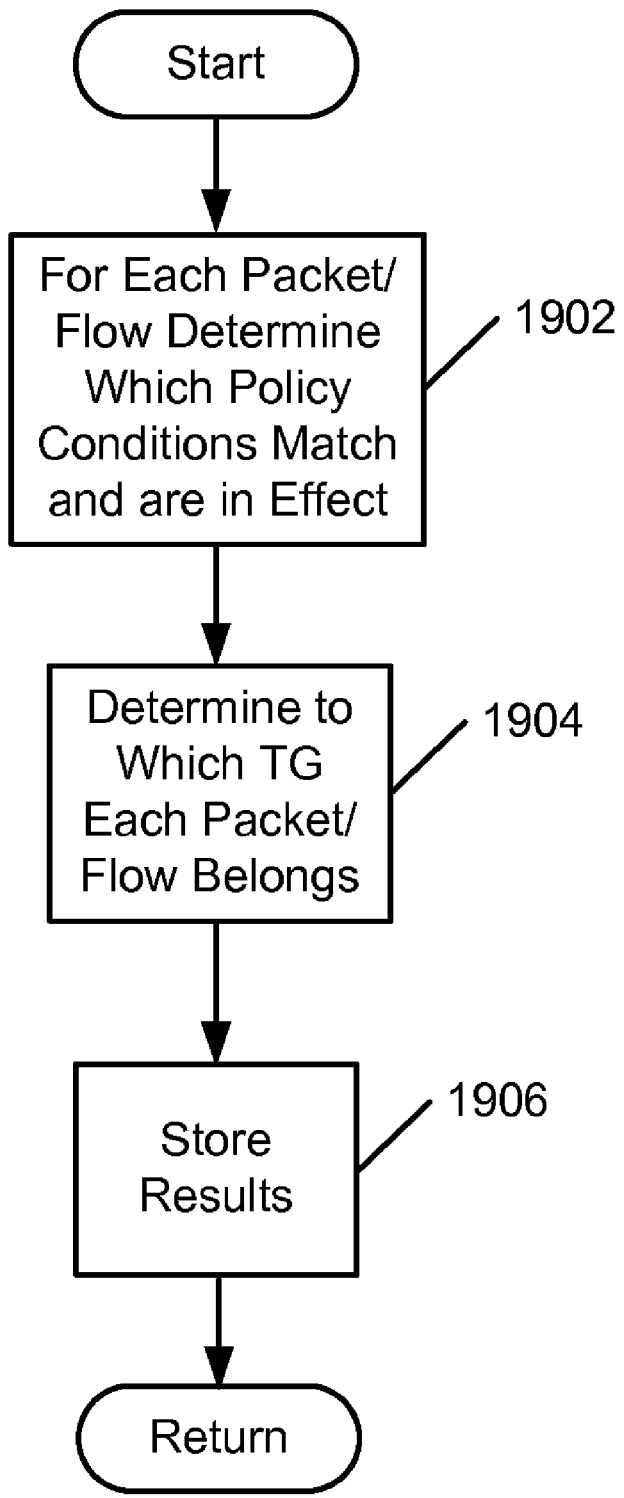
FIG. 19 is a flowchart illustrating processing when determining traffic groups for exemplary packet/flows.

As discussed above, policy analyzer server 102 may assign sets of traffic to traffic groups (FIG. 9, act 906). FIG. 19 is a flowchart that explains processing when policy analyzer server 102 analyzes given packet/flows at a particular policy point to determine traffic groups. Policy analyzer server 102 determines for each given packet/flow which policy conditions match and are in effect (act 1902). Policy analyzer server 102 determines which packet/flows belong to which traffic groups based on the effective policy rule conditions that are satisfied by the particular given packet/flow (act 1904). Policy analyzer server 102 stores the results (act 1906), which may later be displayed via policy analyzer user interface 104 (act 710:FIG. 7).

In the following example, packet/flows are defined. The subscriber and service relationship steps are not shown. The PRs for this example are the rules shown in FIG. 11.

FIG. 20 illustrates the given packet/flows, which may be defined via policy analyzer user interface 104. A1 refers to FTP traffic from address 1.1.1.1. A2 refers to web traffic from address 1.1.1.1. A3 refers to telnet traffic from address 1.1.1.1 from source port telnet (23). A4 refers to SMTP traffic from address 1.1.1.1. A5 refers to video packet traffic from ISP content server 10.10.10.2 (server subnet 10.10.10.0/24).

Policy analyzer server 102 determines, for each packet/flow which policy conditions match and are in effect (act 1902). The process described in FIG. 17 may be used to place PRs in the "in effect" list, the "ignore" list and the eclipsed list for each packet/flow. For example, the sorted PRs may be {PR3, PR2, PR1 and PR4}. Packet/Flow A1 is FTP traffic from 1.1.1.1. Examining the PRs (FIG. 11) in sorted order, one can see that packet/flow A1 satisfies the conditions of PRs 1 and 4. The corresponding actions are RateLimit and Filter. If we assume that the eclipsing rules are the same as in the previous examples, then the two actions have an eclipsing relationship. Because PR1 has a higher priority (lower precedence number), PR1 eclipses PR4.

Performing the same analysis for packet/flow A2, PRs 2 and 4 are satisfied, but PR 4 is eclipsed by PR2 due to precedence. Analyzing packet/flow A3, only PR4 is satisfied. Similarly, the results of the analysis of packet/flow A4, show that only PR4 is in effect for packet/flow A4, SMTP traffic from address 1.1.1.1. Packet/flow A5 is a video packet from ISP content server at 10.10.10.2 (server subnet is 10.10.10.0/24). Packet/flow A5 satisfies conditions of PR3 and PR4, but only PR3 is in effect because PR4 is eclipsed by PR3.

FIG. 21 illustrates which policies of FIG. 11 are satisfied by each packet/flow. For A1, PR1 is in effect. For A2, PR2 is in effect. For A3 and A4, PR4 is in effect. For A5, PR3 is in effect. A network designer may use this information to determine how particular types of traffic will be handled by service provider network 120.

Policy analyzer 102 then determines to which traffic group each packet/flow belongs (act 1904). FIG. 22 illustrates the TGs with respect to packet/flows A1-A5. Referring to FIG. 22, A1 belongs to TG1, A2 belongs to TG2, A3 belongs to TG4, A4 belongs to TG 4, and A5 belongs to TG3. Policy analyzer server 102 may store the results (act 1906).

As one can see from FIG. 22, all packet/flows in a traffic group have the same PR(s) in effect. For example, A1 in TG1 has PR1 in effect, A2 in TG2 has PR2 and PR4 in effect, A5 in TG3 has PR3 in effect, and A3 and A4 in TG4 have PR4 in effect.

Packet Injection and Policy Analyzer Agents

One or more of policy analyzer agents 110 may be included in edge routers 116, core routers 118 and other equipment, such as subscribers' equipment, for example, a personal computer, handheld computer, or any other processing device. Policy analyzer agents 110 may communicate with policy analyzer server 102 and may operate under the control of policy analyzer server 102. Policy analyzer server 102 may issue commands to policy analyzer agents 110 to inject various packet types at a particular rate and may issue commands to the same policy analyzer agents 110 or other policy analyzer agents 110 to measure the results of the packet injection and to report the results to policy analyzer server 102.

Figure 23:
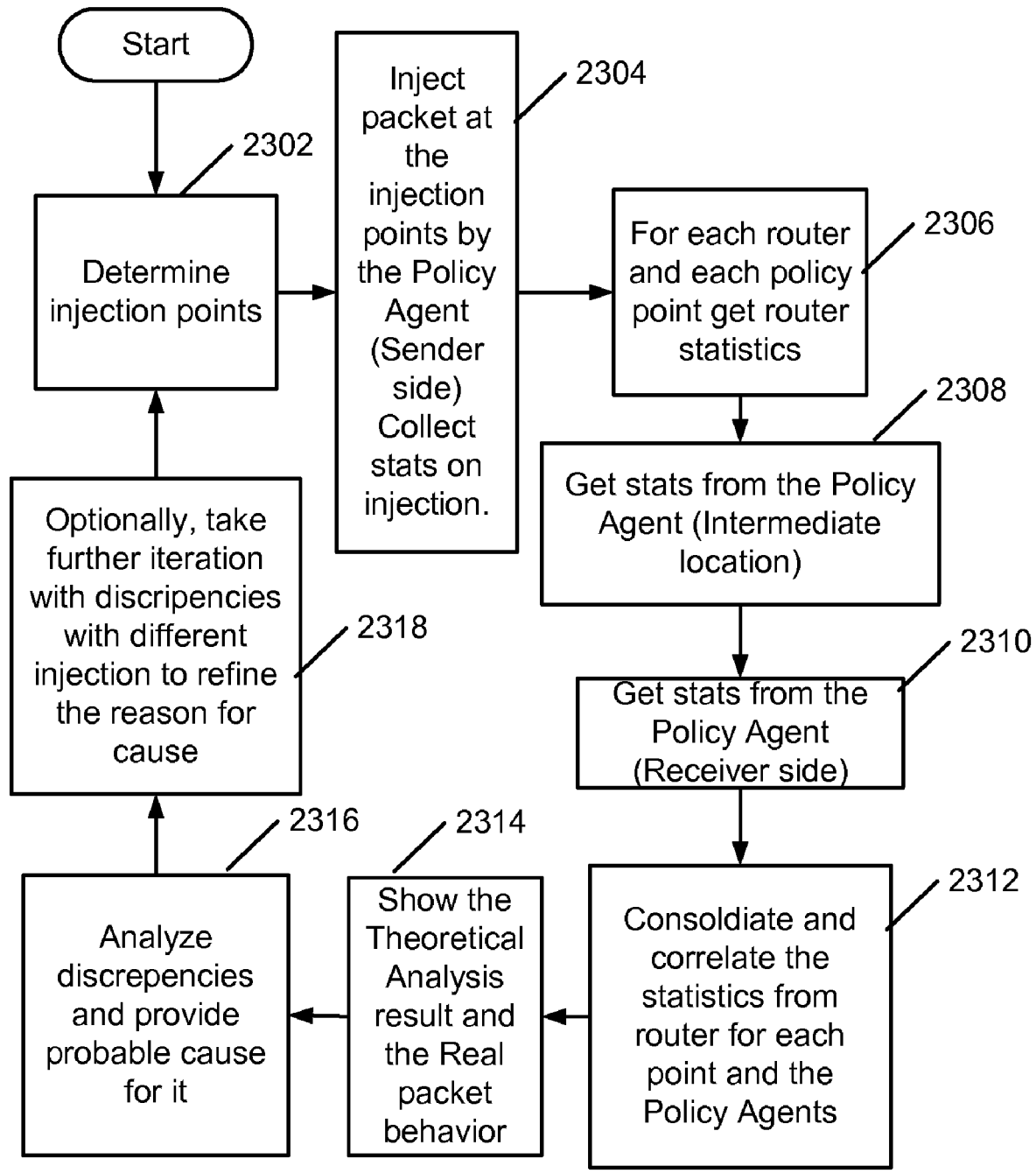
FIG. 23 is a flowchart illustrating processing in an exemplary policy analyzer server associated with injecting packets into a network and collecting packet statistics.

When a user requests policy analysis via policy analyzer user interface 104, the user may be asked whether packets should be injected, and if so, the type and flow of the packets to be injected. FIG. 23 is a flowchart that illustrates the process of packet injection.

Policy analyzer 102 determines injection points (act 2302). Injection points are determined based on the policy points defined in policy and service definitions, and on the flow of packets. For example, when there is one policy point and the flow is bi-directional, two injection points are needed. One injection point injects traffic from the subscriber to the content server and the other injection point injects traffic from the content server to the subscriber.

One of policy analyzer agents 110 at an injection point on a sender side injects traffic (act 2304). For each router and each policy point, the policy analyzer agent may collect injection statistics, which may indicate traffic flow, packets lost, packet rate and the like (act 2306). The collected statistics are sent to policy analyzer server 102. Policy analyzer agents 110 at intermediate locations, such as core routers 118, may collect statistics and may send their statistics to policy analyzer server 102 (act 2308). A policy agent on the receiver side sends its statistics to policy analyzer server 102 (act 2310).

Policy analyzer server 102 consolidates and correlates the statistics from each policy analyzer agent 110 (act 2312). A policy analyzer analysis performed by policy analyzer server 102 may be displayed, along with the consolidated and correlated statistics resulting from the packet injection (act 2314). These statistics may include real packet behavior/treatment that may be compared with theoretical packet behavior/treatment in service provider network 120.

The user may then analyze discrepancies between the theoretical and real packet treatment and determine a probable cause for the discrepancies (act 2316). The reason for the discrepancies may be, for example, invalid assumptions or invalid information, such as a wrong router version number. The user may also change, via policy analyzer user interface 104, the type of data to be injected in order to determine the cause for discrepancies (act 2318). Policy analyzer server 104 and policy agent(s) 110 may again perform acts 2302 through 2316 and any discrepancies in the results may again be analyzed. The user may repeat the process as many times as desired.

CONCLUSION

Methods and systems consistent with the principles of the invention provide systems and methods for analyzing network traffic at policy points and for injecting traffic into the network at injection points.

The foregoing description of preferred embodiments of the invention provides illustration and description, but is not intended to be exhaustive or to limit the invention to the precise form disclosed. Modifications and variations are possible in light of the above teachings or may be acquired from practice of the invention for example, while a series of acts has been described with regard to FIGS. 3, 7-10, 17, 19 and 23, the order of the acts may differ in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method, comprising:
retrieving, by a server device, definitions pertaining to a plurality of policy rules for traffic associated with a subscriber device;
based on the retrieved definitions, defining, by the server device, a plurality of policy points, in a network, for the subscriber device;
determining, by the server device, a plurality of packet treatments, each of the plurality of packet treatments being associated with one of the plurality of policy points, and the each of the plurality of packet treatments identifying one or more of the plurality of policy rules to be applied to the traffic associated with the subscriber device at the associated one of the plurality of policy points; and
outputting, by the server device, information corresponding to the plurality of packet treatments.

2. The method of claim 1, further comprising:
consolidating the plurality of packet treatments; and
distributing, through the network, information representing the consolidated plurality of packet treatments.

3. The method of claim 1, where determining the plurality of packet treatments includes:
assigning, at the one of the plurality of policy points, particular traffic associated with the subscriber device to one of a plurality of traffic groups, where the particular traffic is assigned to the one of the plurality of traffic groups based on one or more of the policy rules.

4. The method of claim 3, where assigning the traffic includes:
identifying which of the plurality of policy rules, associated with the one of the plurality of policy points, have conditions satisfied by the particular traffic; and
identifying which of the plurality of policy rules, associated with the one of the plurality of policy points, have conditions eclipsed by the particular traffic.

5. The method of claim 4, where identifying which of the plurality of policy rules, associated with the one of the plurality of policy points, have conditions eclipsed by the particular traffic is based on eclipsing rules defined for a router associated with the one of the plurality of policy points.

6. The method of claim 1,
where one of the plurality of policy points includes an interface that receives traffic in a direction, and
where determining the plurality of packet treatments includes:
obtaining a list including at least one of the plurality of policy rules, the list defined for the direction that the interface receives the traffic; and
sorting the list based on a precedence associated with each of the at least one of the plurality of policy rules.

7. The method of claim 6, further comprising:
defining permissible combined policy rules;
combining, based on the permissible combined policy rules, two or more of the at least one of the plurality of policy rules in the list; and
resorting the list.

8. A network device, comprising:
a first interface to retrieve definitions in a memory, the definitions pertaining to a plurality of policy rules;
processor to:
define, based on the retrieved definitions, a plurality of policy points in a network, and
determine a plurality of packet treatments, each of the plurality of packet treatments being associated with one of the plurality of policy points, and the each of the plurality of packet treatments identifying one or more of the plurality of policy rules being applied at the associated one of the plurality of policy points; and
a second interface to output information corresponding to the plurality of packet treatments.

9. The network device of claim 8, further comprising:
a third interface to receive management information from a management server device, where the processor, when determining the plurality of packet treatments, uses the management information.

10. The network device of claim 8, further comprising:
a third interface to exchange network information with another device on third network, where the processor, when determining the plurality of packet treatments and defining a plurality of policy points in a network, uses the network information.

11. The network device of claim 8, further comprising: an third interface to:
send commands to an agent associated with one of the plurality of policy points, and
receive information from the agent related to the packet treatment at the associated one of the plurality of policy points.

12. The network device of claim 11, where the third interface is further to:
command the agent to inject packets into the network at the associated one of the plurality of policy points.

13. The network device of claim 12, where the third interface is further to:
receive and store statistics from the agent, the statistics being related to the packet treatment at the associated one of the plurality of policy points in response to the injected packets.

14. The network device of claim 8, where the processor is further to:
when determining the plurality of packet treatments, use policy rule definitions for a subscriber device.

15. The network device of claim 8, where the processor is further to:
analyze traffic received at one of the plurality of policy points, including determining conformance of each of a plurality of sections in the traffic to each of the plurality of policy rules associated with the one of the plurality of policy points; and
based on the analysis, assign each of the plurality of sections in the traffic to one of a plurality of traffic groups.

16. The network device of claim 15, where the processor is further to determine a policy action to be implemented for each of the plurality of traffic groups.

17. A non-transitory computer-readable medium comprising:
one or more instructions which, when executed by a processor, cause the processor to retrieve definitions pertaining to a plurality of policy rules for traffic associated with a subscriber device;
one or more instructions which, when executed by the processor, cause the processor to define, based on the retrieved definitions, a plurality of policy points in a network for the subscriber device; and
one or more instructions which, when executed by the processor, cause the processor to determine a plurality of packet treatments, each of the plurality of packet treatments being associated with one of the plurality of policy points, and the each of the plurality of packet treatments identifying one or more of the plurality of policy rules to be applied to the traffic associated with the subscriber device at the associated one of the plurality of policy points.

18. The computer-readable medium of claim 17, further comprising:
one or more instructions to consolidate the plurality of packet treatments; and
one or more instructions to distribute, through the network, information representing the consolidated plurality of packet treatments.

19. The computer-readable medium of claim 17, where the one or more instructions to determine the plurality of packet treatments include:
one or more instructions to forward instructions to assign, at the one of the plurality of policy points, particular traffic associated with the subscriber device to one of a plurality of traffic groups, where the particular traffic is assigned to the one of the plurality of traffic groups depending on a compliance of the traffic to the policy rules associated with the one of the plurality of policy points.

20. The computer-readable medium of claim 17, where the one or more instructions to determine the plurality of packet treatments include:
one or more instructions to analyze the traffic to determine at least one of the policy rules satisfied by the traffic; and
one or more instructions to consolidate the at least one of the policy rules satisfied by the traffic.

* * * * *